March 5, 1935. C. E. LINDBERG 1,993,011
LAWN SPRINKLER
Filed Nov. 1, 1933
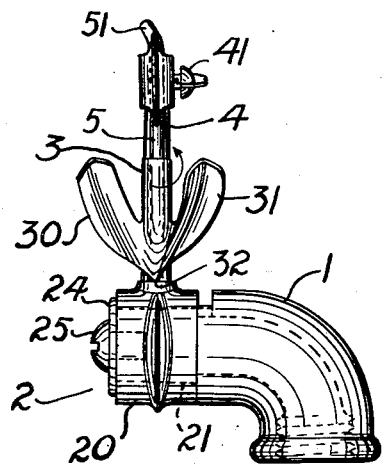
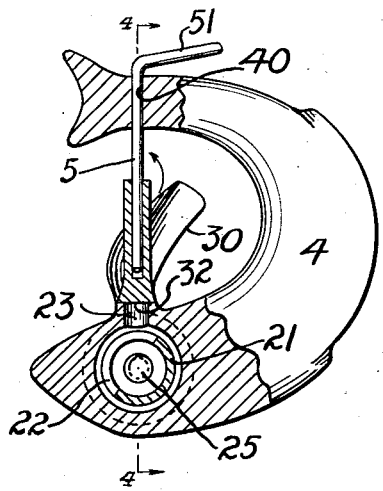
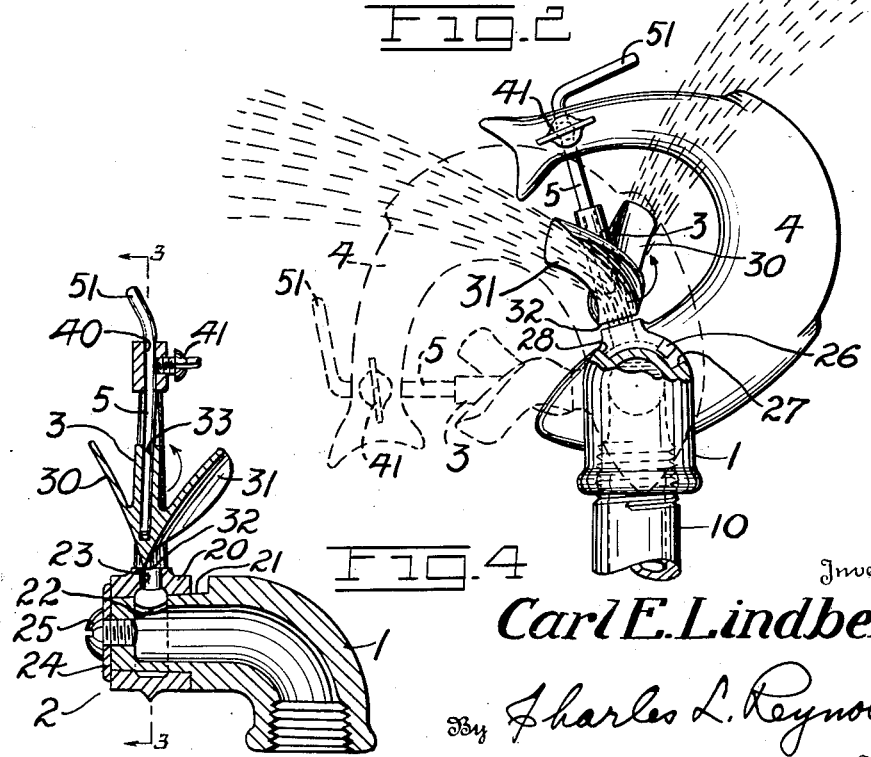
Inventor
Carl E. Lindberg
By Charles L. Reynolds
Attorney Patented Mar. 5, 1935

1,993,011

UNITED STATES PATENT OFFICE 1,993,011

LAWN SPRINKLER

Carl E. Lindberg, Silverdale, Wash.

Application November 1, 1933, Serial No. 696,198

4 Claims. (Cl. 299—126)

My invention relates to lawn sprinklers or the like, and in particular to that type of sprinkler wherein the water is distributed by a member which is rotated by the action of the water emitted.

It is an object of my invention to provide a device which can be quickly and easily adjusted in different ways, independently or jointly, for the purpose of regulating the lateral distribution of the water, whereby one sprinkler may be adapted for use under varying conditions, particularly with regard to adjacency to objects or areas it is not desired to water.

A further object of my invention is to provide a sprinkler which will operate on very low pressure.

Also an object of my invention is to provide means for dividing the stream of water so that its force will be best expended to throw the water as far as possible, when it is desired to water a large area.

Still another object is to shape the various parts so that they will offer the least possible interference with the distribution of the water.

It is also my object to provide a mechanism of simple construction and having few parts; one which will not easily get out of order and the parts of which are subject to little wear during operation of the sprinkler.

My invention comprises the novel parts and arrangement, a preferred form of which is illustrated in the drawing and described in the specification. My invention may, however, take other forms not illustrated, within the scope of the appended claims.

Figure 1 is a front elevation of my sprinkler in the form now preferred by me.

Figure 2 is a side elevation, illustrating one manner in which my sprinkler may be adjusted to change the water distribution.

Figure 3 is a sectional view taken on the line 3—3 of Figure 4.

Figure 4 is a sectional view taken on the line 4—4 of Figure 3, showing the sprinkler adjusted to give a non-uniform water distribution.

My sprinkler includes an elbow 1 which may be supported on an upright pipe 10. The base, generally indicated at 2, consists of a sleeve 20 rotatably mounted on a closed-end nipple 21, and held thereon by a washer 24 held in place by a screw 25 received in the closed end of the nipple, in which nipple is cut a circumferential slot extending somewhat more than a quarter of the distance around its periphery. Cooperating with the slot 22 is a delivery aperture 23 in the sleeve 20. Normally this aperture faces upward, but as shown in Figure 2, the sleeve 20 may be rotated upon the nipple 21, so that the aperture 23 may face at any angle between the vertical and the horizontal in a given vertical plane. A stop pin 26 engaging the shoulders 27 and 28 limits the possible rotation of the sleeve on the nipple.

Disposed adjacent to the aperture 23 is the spinner 3 which is rotated by the stream of water ejected from the aperture and operates to distribute the water during its rotation. The spinner includes two wings 30 and 31 which, as shown, form oppositely disposed troughs projecting upwardly and outwardly, and curving backward so that the water will exert a driving effect on the spinner. The lower part of the spinner defines a knife edge 32 which divides into two parts the water stream issuing from the aperture 23, and which merges immediately into the curvature of the wings.

Extending outward and then upward from the base 2 is a bracket 4 which is streamlined in section to obstruct the distribution of the water to the smallest possible degree. As shown the bracket 4 is curved so that its upper end lies above the aperture 23 when it is facing upward. In the upper end of this bracket is disposed a hole 40 within which is received a rod 5. This rod seats in a socket 33 in the upper part of the spinner 3, to act as the spinner bearing and its sole support. A screw 41 threaded in the bracket 4 may be screwed in to clamp the rod 5 in any desired position.

When water is delivered through the aperture 23 it strikes against the spinner 3, raising its knife edge 32 slightly from contact with the base 2 and lifting it until the bearing rod 5 engages the end of the bearing socket or seat 33. The knife edge 32 still lies very close to the outlet orifice, and divides the stream of water, each of which divisions, following up the wings 30 and 31 respectively, produces a torque on the spinner to rotate it, and by this action to distribute the water.

The rod may be slightly out of axial alignment with the aperture 23. This may be accomplished in several ways, for instance, by bending it, if it is made (as I prefer) of material which can be easily bent. If it is desired to throw more water on one side than on the opposite side the rod 5 may be bent slightly to displace the knife edge 32 to a position eccentric of the delivery aperture 23, as shown in Figure 4. When positioned in this manner it is obvious that the water stream issuing from the aperture 23 will be divided into two unequal parts, the larger stream being deflected to the right in Figure 4, and the smaller stream to the left. In this way more water may be distributed to one section than to another without disturbing the location of the sprinkler itself.

The plane of distribution as a whole may be changed if desired, as shown in Figure 2, in which case water would be thrown farther on two opposite sides of the sprinkler than on the other two opposite sides. By combining this adjustment with bending of the rod 5, the sprinkler may be arranged to throw but little water downward (if any), thus avoiding washing out lawn or soil immediately beneath it.

Whether or not the rod 5 is bent, it can be moved vertically, thus to space the knife edge 32 from the base 2 a more or less amount during operation of the sprinkler, as desired. However, it is deemed preferable to keep the knife edge as close as possible to the orifice, for this will divide it before any appreciable dispersion occurs, and the sprinkler will then operate on extremely low pressure heads.

What I claim as my invention is:

1. A sprinkler comprising a peripherally slotted nipple adapted for connection to a water supply source, an apertured sleeve rotatably mounted and having an internal groove communicating with the nipple's slot and with said aperture, a spinner disposed above said aperture, and a support for the spinner carried by said sleeve, whereby the aperture and the spinner may be adjusted angularly about the nipple by rotation of the sleeve.

2. A sprinkler comprising a base having a delivery aperture therein, a spinner having a straight knife edge disposed to rest upon the base and extending across said aperture, and in operation dividing the water stream issuing therefrom, to be supported by such stream, a bracket integral with and extending upward from said base, a bearing rod supported from the bracket, engaging said spinner from above to limit its movement upward from the base and aperture, and to maintain it in registry with the issuing stream, and means for adjusting said bearing rod vertically with respect to said bracket, to space said knife edge closer to or farther from said aperture during operation of the sprinkler.

3. A sprinkler comprising a base having a delivery aperture therein, a spinner having a straight knife edge adjacent to said aperture, in operation floating upon and supported by the water stream issuing therefrom, to divide and to disperse such water stream, and bearing means engaging said spinner from the side opposite said knife edge to limit lateral and endwise movement thereof.

4. A sprinkler comprising a base having a delivery aperture therein, a spinner having a straight knife edge disposed above said aperture and supported thereby when no water is flowing from said aperture, and adapted to be raised, spaced from said aperture, and rotated by a stream of water issuing therefrom, to divide and disperse such water stream, means engaging said spinner to limit lateral and endwise movement thereof, and means for adjusting said first means to vary the limits of spinner movement.

CARL E. LINDBERG.